(12) United States Patent
Spitz et al.

(10) Patent No.: US 8,327,035 B2
(45) Date of Patent: Dec. 4, 2012

(54) METHOD FOR EXECUTING AN APPLICATION WITH THE AID OF A PORTABLE DATA STORAGE MEDIUM

(75) Inventors: Stephan Spitz, München (DE); Walter Hinz, Garching (DE)

(73) Assignee: Giesecke & Devrient GmbH, Munich (DE)

( * ) Notice: Subject to any disclaimer, the term of this patent is extended or adjusted under 35 U.S.C. 154(b) by 268 days.

(21) Appl. No.: 12/445,201

(22) PCT Filed: Oct. 15, 2007

(86) PCT No.: PCT/EP2007/008933
§ 371 (c)(1),
(2), (4) Date: Sep. 25, 2009

(87) PCT Pub. No.: WO2008/046575
PCT Pub. Date: Apr. 24, 2008

(65) Prior Publication Data
US 2010/0042760 A1 Feb. 18, 2010

(30) Foreign Application Priority Data
Oct. 16, 2006 (DE) .......................... 10 2006 048 797

(51) Int. Cl.
*G06F 3/00* (2006.01)
*H04L 29/06* (2006.01)
(52) U.S. Cl. .......................................... 710/3; 713/167
(58) Field of Classification Search ........ 710/2; 713/167
See application file for complete search history.

(56) References Cited

U.S. PATENT DOCUMENTS

| | | | |
|---|---|---|---|
| 6,078,908 A | 6/2000 | Schmitz | |
| 2005/0221853 A1 | 10/2005 | Silvester | |
| 2005/0246282 A1* | 11/2005 | Naslund et al. | 705/52 |
| 2006/0075227 A1* | 4/2006 | Park | 713/167 |
| 2007/0133803 A1* | 6/2007 | Saito et al. | 380/267 |
| 2007/0288383 A1* | 12/2007 | Kim et al. | 705/51 |
| 2008/0107269 A1* | 5/2008 | Gehrmann et al. | 380/270 |

FOREIGN PATENT DOCUMENTS

| | | |
|---|---|---|
| DE | 19718103 A1 | 6/1998 |
| WO | 2004032414 A1 | 4/2004 |
| WO | 2006029768 A1 | 3/2006 |

OTHER PUBLICATIONS

International Search Report in PCT/EP2007/008933, Feb. 4, 2008.

* cited by examiner

*Primary Examiner* — Hyun Nam
(74) *Attorney, Agent, or Firm* — Bacon & Thomas, PLLC

(57) ABSTRACT

The invention relates to a method for carrying out an application with the help of a portable data carrier (1). With the method according to the invention via a first data channel (5) of the portable data carrier (1) a data connection with a first external device (2) is formed. Involving the first external device (2), a first part of the application is executed. Via a second data channel (6) of the portable data carrier (1) a data connection with the first or a second external device (3) is formed. From the portable data carrier (1) via the second interface (6) there are transferred identification data, which were provided on the execution of the first part of the application, to the external device (3). A second part of the application is not executed until after a release by a user.

23 Claims, 1 Drawing Sheet

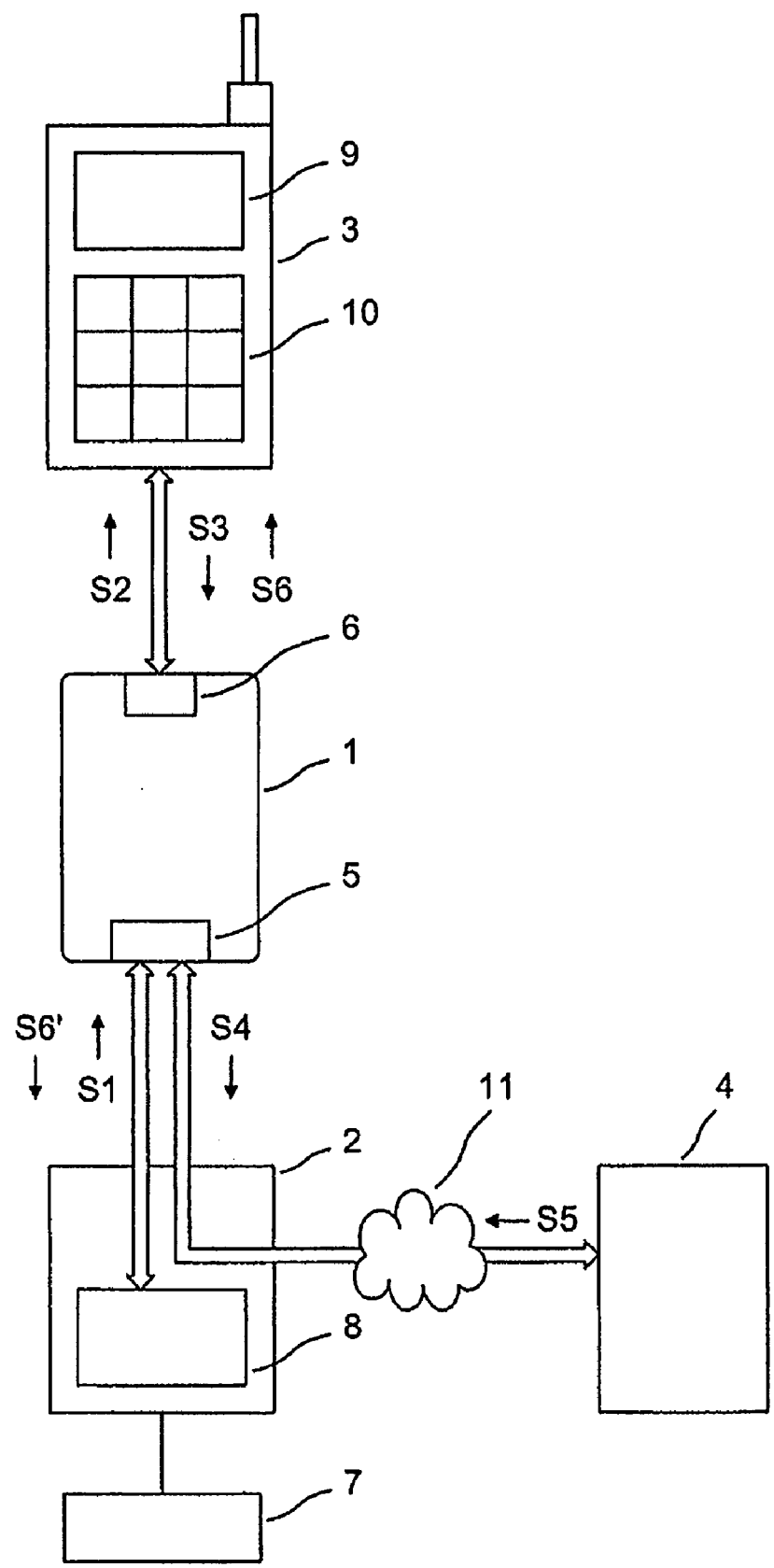

METHOD FOR EXECUTING AN APPLICATION WITH THE AID OF A PORTABLE DATA STORAGE MEDIUM

FIELD OF THE INVENTION

The invention relates to a method for executing an application with the help of a portable data carrier.

BACKGROUND

When executing an application, with the help of a portable data carrier there can be ensured a high security against manipulations when the portable data carrier is formed in a manipulation-proof manner. This is of greatest importance for example for applications with which cashless payment transactions are carried out. But the manipulation protection is only ensured, when the application is executed within the portable data carrier.

For executing an application, however, in many cases in addition to the portable data carrier an external device is required. If this is a device protected against manipulations, such as for example a chip card reader of a high safety class, normally this will not lead to security problems. But often there are used devices which are not protected against manipulations or are only insufficiently protected, such as for example a personal computer. As to be able to carry out a transaction with a remotely disposed server, in addition, an online connection is required, for example via the Internet. This involves the risk of manipulations by viruses or Trojans. For example, the data displayed on the screen of the personal computer can be tampered by these manipulations. In a home banking application this can lead to the displayed transaction data varying from the actual transaction data and thus the user actually releases a different transaction than he intends to according to the displayed data.

A possibility to defend such attacks is to integrate a display unit and a confirmation device in the portable data carrier. From WO 2004/032414 A1 a method for the digital signing of data by a user is known. Here the data to be signed are transmitted to a chip card, which is used as a signing device. The data are displayed to the user by the chip card. By the user operating a confirmation device, the data are digitally signed with the help of a processor.

From DE 10 2004 046 847 A1 is known a method for generating a digital signature for data to be signed by a user by means of a portable data carrier. With this method identification data for the data to be signed are determined in a server and compared with comparative data. In the server a selection of the data to be signed is determined and displayed to the user. When after the step of displaying a release of the signature generation is effected by the user, the signature is generated in the portable data carrier. The display is effected, for example, on a display unit of the portable data carrier or a manipulation-protected terminal. Likewise, it is possible to use a mobile terminal for the display to which the display data and/or identification data are transmitted by the server.

However, a portable data carrier, such as for example a chip card, having a display device is relatively complex. Manipulation-protected terminals are also relatively complex and expensive and hardly suitable for applications, for which a low-cost infrastructure is required.

WO 2006/029758A1 discloses a method for releasing an access in a or via a computer network, to which a terminal is connected at least temporarily. The terminal can be, for example, a personal computer, a telephone or a personal digital assistant. With the known method a data connection between the terminal and a portable device for providing access data, for example a chip card or a token, is established. The portable device is integrated in a communication path between the terminal and the computer network. With the help of the access data the release of the access is triggered.

The invention is based on the object to achieve a protection against manipulations as good as possible and with reasonable effort when executing an application with the help of a portable data carrier in which an external device is involved.

SUMMARY

It is a basic idea of the invention to increase the security by the portable data carrier using two different data channels, so as to execute an application at least partially with the help of the first data channel and to provide identification data for the executed application via a second data channel. The identification data are provided for being shown to a user. A second part of the application is not executed until after a release by the user.

The invention has the advantage, that when executing the application a good protection against manipulations is achievable, since for executing the second part of the application a release by the user is required. From the identification data the user can determine whether a manipulation has occurred and, if so, can refuse the release.

The second part of the application preferably is carried out with the identification data provided by the first part of the application. This permits that the user has an effective control.

The portable data carrier can use two different interfaces for the two data channels. For a successful attack on the execution of the application the attacker would have to manipulate the two interfaces.

Via the second data channel the portable data carrier can address a second functionality of external devices, which preferably is not part of the executed application. For a successful attack on the execution of the application the attacker would have to simultaneously manipulate the second functionality. The second functionality preferably is a standard function of the external device, such as for example proactive commands of the SIM toolkit. It is especially advantageous when the second functionality, as in the case of proactive commands (DISPLAY TEXT and GET INKEY), can be controlled by the portable data carrier.

The second interface can connect the portable data carrier in particular also with a second external device. For a successful attack on the execution of the application the attacker would have to manipulate the two external devices.

In such a variant of the method for carrying out an application with the help of a portable data carrier, via a first interface of the portable data carrier a data connection with a first external device is formed. Involving the first external device a first part of the application is executed. Via a second interface of the portable data carrier a data connection with a second external device is formed. Via the second interface from the portable data carrier identification data, which were provided on the execution of the first part of the application, are transferred to the second external device. A second part of the application is not executed until after a release by a user.

It is especially advantageous, when the identification data are displayed at least partially on a display device of the second external device. In this way the identification data can be made accessible to the user.

The release can be triggered by actuating an input device of the first external device or an input device of the second external device. So as to achieve an especially high security level, release data can be entered into the first external device or into the second external device. In particular, as release data there can be entered data which are displayed on the display device of the second external device.

Within the framework of the method according to the invention a release information can be transferred from the first external device via the first interface of the portable data carrier or from the second external device via the second interface of the portable data carrier to the portable data carrier.

Here it is especially advantageous, when the release information at least partially contains the release data. The release data then can be used for being further processed in the portable data carrier. In particular, the release information can be adjusted to the identification data such that the release of the second part of the application only becomes effective when the second part of the application is executed on the basis of the identification data. This has the advantage that a manipulation of the release can be prevented, since the release information exclusively permits the desired and no other execution of the application. The release information can be linked with the identification data for example by a cryptographic relation.

The application can be, for example, an application for carrying out a cashless payment transaction. Here the identification data can represent the data characterizing the transaction, for example an amount of money to be transferred, a banking connection etc. Within the framework of the first part of the application the data characterizing the transaction can be transferred from the first external device to the portable data carrier. Within the framework of the second part of the application the data characterizing the transaction can be transferred from the portable data carrier via a network, in particular the Internet, to a server.

The data connection via the first interface of the portable data carrier can be formed for example by a contact-type contacting. The data connection via the second interface of the portable data carrier preferably is formed in a contactless fashion. This has the advantage, that the data connection via the second interface can be established without an additional infrastructure and this additional data connection does not complicate the handling.

As a first external device there can be used a computer, in particular a personal computer. Personal computers are very widely used, so that the method according to the invention is suitable for a mass use. As a second external device there can be used a mobile telephone or a chip card reader. The use of a mobile telephone has the advantage that a high percentage of the potential users of the method according to the invention already have a mobile telephone. A further advantage is that a mobile telephone normally is kept carefully by its owner and is protected by a secret number. Therefore, a mobile telephone normally is considered to be a trustworthy device by its owner.

As a portable data carrier there is preferably used a chip card or a token. These are cost-effectively available, can be easily brought along by a user and meet a high security standard.

DETAILED DESCRIPTION OF THE PREFERRED EMBODIMENTS

In the following the invention is explained with reference to the embodiment shown in the FIGURE.

The only FIGURE shows a schematic block diagram for an arrangement with which the method according to the invention can be carried out. There are shown a chip card 1 as an embodiment of a portable data carrier, a personal computer 2, a mobile telephone 3 and a server 4. The structure of all these devices is not reproduced in detail, but there are shown functional components which are used for describing the method according to the invention.

Instead of chip card 1, for example, also a token or the like can be provided. Mobile telephone 3 for example can be replaced by a chip card reader.

A first interface 5 and a second interface 6 are shown as functional components of chip card 1. Interfaces 5 and 6 are components of an integrated circuit not shown in the FIGURE, which has still further functional components not shown in the FIGURE. The first interface 5 for example can be formed as a contact-type interface, with which by a contact-type contacting of a contact field of the chip card 1 not shown in the FIGURE a communication with chip card 1 can be effected. The second interface 6 of chip card 1 can be a contactless interface, which permits a communication with chip card 1 without a galvanic connection to the communication partner, for example an NFC interface. NFC here stands for Near Field Communication and refers to a short-range data transmission by means of magnetic alternating fields.

With personal computer 2 only a keyboard 7 and a browser 8 are shown. As functional components of the mobile telephone 3 a display 9 and a keypad 10 are shown.

By double arrows in the FIGURE there are shown data connections between the functional components, which are of interest for the method according to the invention. As to be inferred from the FIGURE, via first interface 5 of chip card 1 there can be established a data connection between chip card 1 and browser 8 of personal computer 2. Furthermore, via first interface 5 of chip card 1 there can be established a data connection between chip card 1 and server 4. This data connection runs via the personal computer 2 and via a network 11 to which the personal computer 2 is connected, for example via the Internet. The communication between chip card 1 and browser 8 and the communication between chip card 1 and server 4 in each case can be effected via the HTTPS protocol.

Via second interface 6 of chip card 1 there can be formed a data connection between chip card 1 and mobile telephone 3.

With the arrangement shown in the FIGURE there can be carried out, for example, home banking applications, or handled other cashless payment transactions. In the following the sequence of operations of the method according to the invention is explained in more detail using the example of a home banking application:

In a transmission step S1 from browser 8 a transaction request is transferred via first interface 5 of chip card 1 to chip card 1 for forwarding it to server 4. Thus the transaction request is transferred from browser 8 not directly to server 4, but via chip card 1, which serves as an authentication gateway and can be operated for example similar to a proxy server. The transaction request is generated for example from data which the user enters with the help of keyboard 7 of personal computer 2 and can contain among other things specifications regarding an amount of money to be transferred, a banking connection etc.

Chip card 1 forwards the transaction request not immediately to server 4, but first requests in a transmission step S2 via its second interface 6 a release of the transaction from mobile telephone 3. For this purpose chip card 1 can transmit for example the transaction data completely or only parts of them to mobile telephone 3. Mobile telephone 3 displays the transmitted transaction data on its display 9, so that the user can read them, and prompts the user to release the transaction when the displayed transaction data correspond to the transaction data desired by the user. The release can be effected for example by an input on keypad 10 of mobile telephone 3.

Accordingly, in a transmission step S3 a release information is transmitted from mobile telephone 3 via second interface 6 of chip card 1 to chip card 1. Dependent on the security requirements, there can be provided that the transaction request is signed and/or authenticated after the receipt of the correct release information. Then in a transmission step S4 the transaction request is forwarded from chip card 1 via first interface 5 of chip card 1, personal computer 2 and network 11 to server 4. Server 4 carries out the transaction and in a transmission step S5 transfers an execution information via network 11, personal computer 2 and first interface 5 of chip card 1 to chip card 1. In a transmission step S6 chip card 1 forwards the execution information of server 4 via its second interface 6 to mobile telephone 3 for displaying it on display 9. Alternatively, in a step S6' chip card 1 can forward the execution information of server 4 via its first interface 5 to browser 8.

The above-described proceeding is based on the assumption, that mobile telephone 3 is a trustworthy device for the user and therefore the user can assume that the displayed transaction data are identical with the actual transaction data of the transaction request present in chip card 1.

In a development of the method according to the invention, after the transmission step S2 on display 9 of mobile telephone 3 is displayed a transaction number for the transaction request. The transaction number legitimates the transaction and for a protection against manipulations is unequivocally connected with the transaction request by a digital signature generated by chip card 1. For releasing the transaction the user enters the transaction number on keypad 10 of mobile telephone 3 or on keyboard 7 of personal computer 2. In the last-mentioned case the transaction number, for example, is transferred from browser 8 via first interface 5 of chip card 1 to chip card 1.

For entering the transaction number a trustworthy input device is not required, since with the transaction number there can be legitimated only the transaction request present at that moment in chip card 1. For a transaction request which has been changed in comparison to the just mentioned transaction request, for example as a result of a manipulation, the transaction number is not valid.

In a variation of the described proceeding it is also possible to omit mobile telephone 3 and to use a chip card 1 having a display. In this case the transaction data are displayed on the display of chip card 1. The user checks the transaction data and will effect a release of the transaction, if the transaction data are correct.

Further embodiments are methods in which no second terminal is used, but only a second data channel to the first external terminal. In the following, as an example for such embodiments methods are described in a system which has a transaction server, a mobile telephone and its security module (SIM card).

A user opens an application on its mobile phone, which with the help of the security module and a transaction server permits a transaction via the Internet. Preferably, for this the security module as a http proxy provides a secure Internet connection to the transaction server. The in the present meaning first data channel between security module and the mobile phone could be effected via the ISO contacts (C2, C3 and C7) of the security module. But preferably the USB contacts (C4, C8) of the security module are used as an interface for the first data channel. On the first data channel via a TCP/IP layer HTML-formatted data are exchanged with the application. As a third data channel there can be regarded the connection of the portable data carrier with the transaction server via the Internet.

Optionally, the security module receives from the transaction server via a fourth data channel preferably in the form of an SMS via the mobile phone network (Push SMS according to specification ETSI TS 31.115/116), a confirmation of the transaction data. The transaction data, which were determined via the first data channel, are shown to the user for releasing the transaction with the help of a second data channel between mobile phone and the security module. With the help of the proactive command DISPLAY TEXT (according to the specification GSM 11.14) the representation of the transaction data on the display of the mobile phone is effected. The second data channel can be led via a different interface, a different protocol and/or different functions in the mobile phone. It uses, for example, other contacts (C2, C3 and C7) than the first data channel (C4, C8). The second data channel, moreover, can use a differing transmission protocol (T=0 or T=1 ⇔ USB). Via the second data channel the data are not transmitted to the application to be secured, but to a different function which preferably is a standard function of the mobile phone.

Optionally, with the help of the further proactive command GET INKEY a release of the transaction via the second data channel can be requested. But, alternatively, a release signal for the transaction can also be transmitted from the mobile phone via the first data channel to the security module.

The transaction data received by the transaction server via the fourth data channel can contain, for example, a TAN (transaction number) as a release information which is displayed to the user with the help of the second data channel. The user can enter the shown TAN in an HTML page provided via the first data channel in order to release the transaction. But, preferably, a release information, such as a TAN, is shown to the user not as text but as an image (proactive command: DISPLAY IMAGE), so as to make an automatic extraction of the release information more difficult.

The release of the transaction or the result of the further execution of the application, likewise, can be transferred either via the third or the fourth data channel to the transaction server, i,e. for example as HTML data or as an SMS.

The invention claimed is:

1. A method for carrying out an application with the help of a portable data carrier, comprising the steps:
   forming a data connection with a first external device via a first data channel of the portable data carrier;
   executing a first part of the application with involvement of the first external device;
   forming a second data connection with the first external device or with a second external device via a second data channel of the portable data carrier;
   transferring identification data from the portable data carrier, which were provided on the execution of the first part of the application via the second data channel, wherein the identification data enables a determination by a user of whether a manipulation has occurred and upon a determination of a manipulation occurrence, enables a refusal of a release by the user; and
   delaying execution of a second part of the application on the first external device until after the release by the user.

2. The method according to claim 1, including using as the first data channel a first interface of the portable data carrier and as the second data channel a second interface of the portable data carrier.

3. The method according to claim 1, wherein the identification data are transmitted via the second data channel to a second functionality of the first external device which is not a part of the executed application.

4. The method according to claim 1, wherein the second data connection is formed with the second external device.

5. The method according to claim 1, wherein the second part of the application is carried out with the identification data provided by the first part of the application.

6. The method according to claim 1, wherein the identification data are displayed at least partially on a display device of the first or of the second external device.

7. The method according to claim 1, wherein the release by a user is triggered by actuating an input device of the first external device or an input device of the second external device.

8. The method according to claim 1, wherein release data are entered into the first external device or into the second external device.

9. The method according to claim 8, wherein, as release data, data are entered which are displayed on the display device of the second external device.

10. The method according to claim 1, wherein from the first external device via the first interface of the portable data carrier or from the second external device via the second interface of the portable data carrier a release information is transferred to the portable data carrier.

11. The method according to claim 10, wherein the release information at least partially contains the release data.

12. The method according to claim 10, wherein the release information is adjusted to the identification data such that the release of the second part of the application becomes effective only when the second part of the application is executed on the basis of the identification data.

13. The method according to claim 10, wherein the release information is linked with the identification data by a cryptographic relation.

14. The method according to claim 1, wherein the application is an application for carrying out a cashless payment transaction.

15. The method according to claim 1, wherein the identification data are displayed as data characterizing a transaction.

16. The method according to claim 15, wherein within the framework of the first part of the application the data characterizing the transaction are transferred from the first external device to the portable data carrier.

17. The method according to claim 15, wherein, within the framework of the second part of the application, the data characterizing the transaction are transferred from the portable data carrier via a network.

18. The method according to claim 1, wherein the data connection via the first interface of the portable data carrier is formed by a contact- type contacting.

19. The method according to claim 1, wherein the data connection via the second interface of the portable data carrier is formed in a contactless fashion.

20. The method according to claim 1, wherein, as a first external device, a computer is used.

21. The method according to claim 1, wherein, as a second external device, a mobile telephone or a chip card reader is used.

22. The method according to claim 1, wherein, as a portable data carrier, a chip card or a token is used.

23. A portable data carrier adapted to execute a method according to claim 1.

* * * * *